Figure 1:
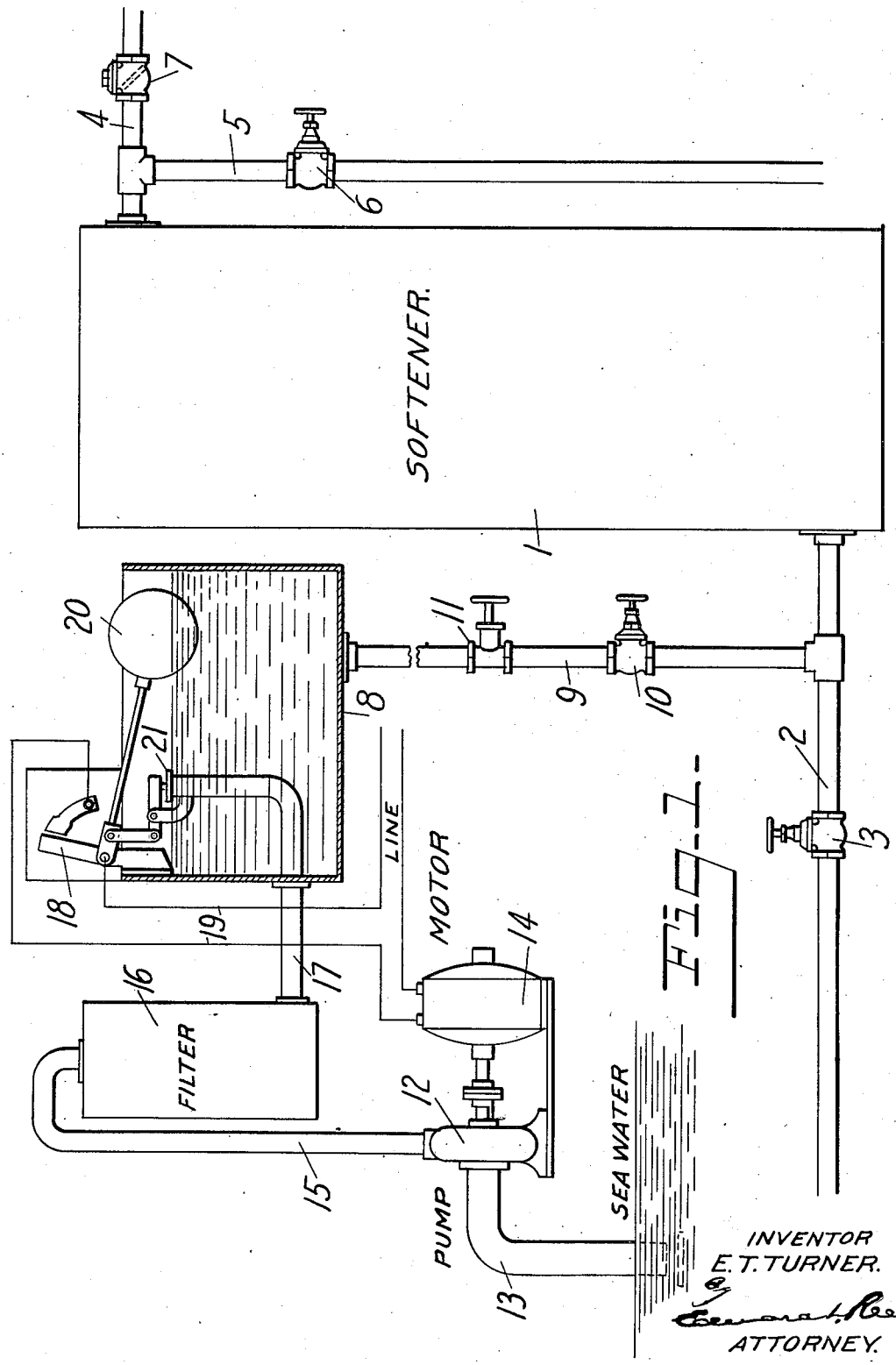

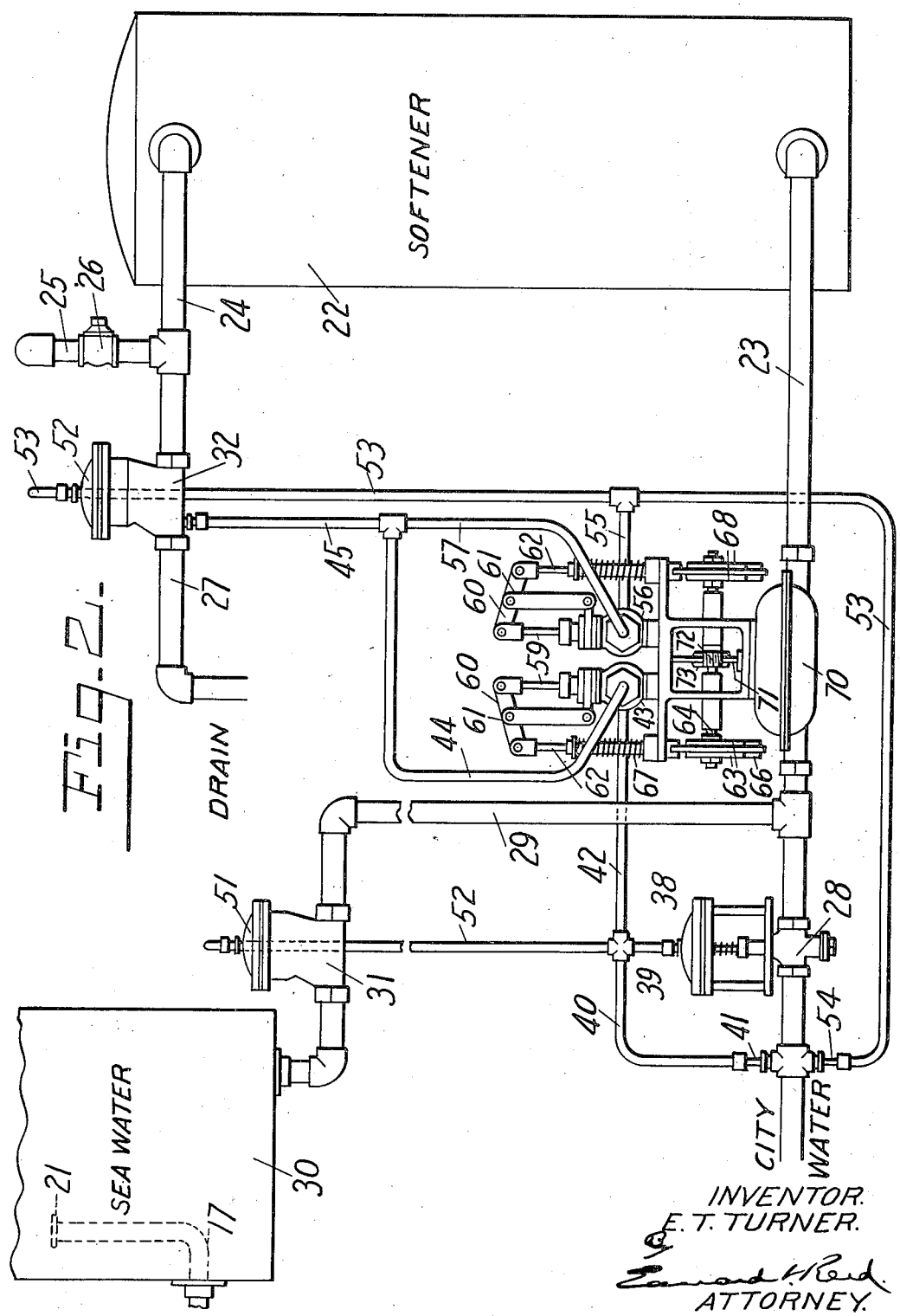

July 30, 1929. E. T. TURNER 1,722,603
METHOD AND APPARATUS FOR RECONDITIONING THE WATER
SOFTENING MATERIAL IN A SOFTENING APPARATUS
Filed July 5, 1927   3 Sheets-Sheet 3
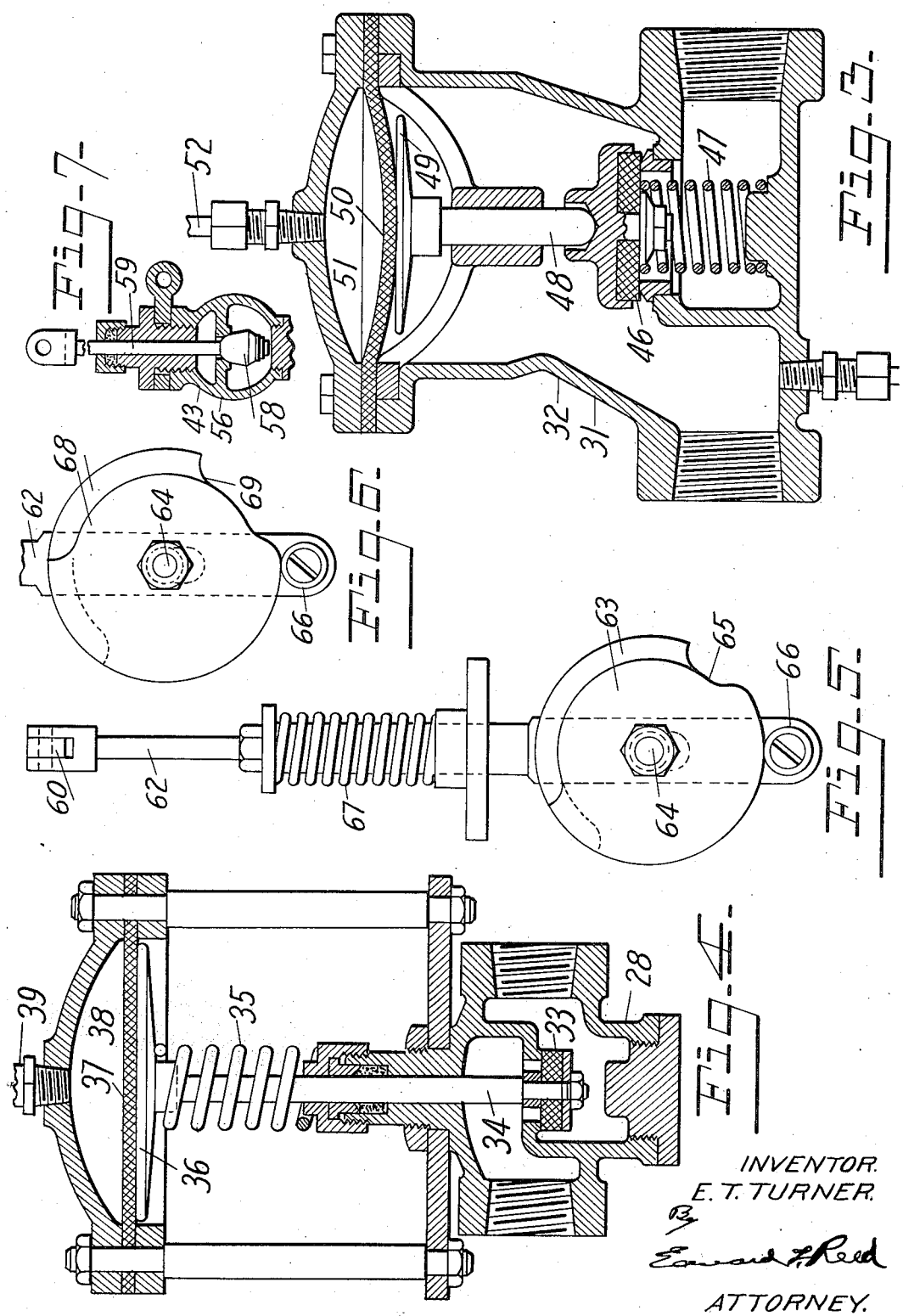
INVENTOR.
E. T. TURNER.
By
Edward F. Reed
ATTORNEY.

Patented July 30, 1929.

1,722,603

UNITED STATES PATENT OFFICE.

EDWARD T. TURNER, OF DAYTON, OHIO.

METHOD AND APPARATUS FOR RECONDITIONING THE WATER-SOFTENING MATERIAL IN A SOFTENING APPARATUS.

Application filed July 5, 1927. Serial No. 203,374.

This invention relates to a water softening apparatus and more particularly to a method and apparatus for reconditioning the water softening material in such an apparatus.

In water softening apparatus of the type here contemplated the water is softened by passing the same through a material, such as zeolite or glauconite, having the property of absorbing the substances which harden the water and thereby rendering the water soft. When the water softening material has taken up such quantities of the hardening substances that it will no longer properly soften the water it is reconditioned by subjecting the same to the action of a salt solution which removes therefrom the water hardening substances and restores the normal base of the softening material. After the material has been reconditioned clear water is passed through the same to wash out the salt and place the apparatus again in condition for the water softening operation. Water in different localities differs greatly in hardness and the harder the water the more frequently is it necessary to recondition the softening material. Many localities in which the water is very hard are remote from the source of salt supply and, due to cost of transportation and the like, the salt used for reconditioning the water softening material is relatively expensive. Because of the frequency with which the water softening material must be reconditioned and the high price of the salt in such localities the cost of operating a softener of this type is quite high and it is sometimes so high as to be prohibitive, this being especially true in the case of municipal water softening plants. Many cities located on or close to the sea coast have very hard water. For example, in some cities on the coasts of Florida and Southern California the city water contains as much as fifty grains of hardness.

The efficient and economical operation of an exchange base mineral water softener requires that the salt solution or brine which is used for regenerating purposes shall not be less than five percent saturated, or more than fifteen percent saturated. Usually the brine supply at its source is a saturated solution and this saturated solution is mixed with fresh water, as it is introduced into the softener, in proportion of about nine or ten parts of fresh water to one part of saturated salt solution. Ordinary sea water contains salt in approximately the proportion above mentioned and is well adapted for use as a regenerating solution without modification. Sea water of average composition contains solids in solution approximately as follows:

| | Per cent. |
|---|---|
| $NaCl$ | 77.758 |
| $MgCl$ | 10.878 |
| $MgSO_4$ | 4.737 |
| $CaSO_4$ | 3.600 |
| $K_2SO_4$ | 2.465 |
| $MgBr_2$ | .217 |
| $CaCO_3$ | .345 |

A saturated salt solution contains approximately 240 parts of salt per one thousand parts of solution. As shown by the following analysis sea water contains approximately 26 parts of salt per one thousand, the sodium and part of the chloride combining to form sodium chloride in substantially that proportion: Na 11.08, Cl 19.46, Mg .957, Ca .457, K .76, Br .407, $So_4$ 2.58. While the proportions of solids will vary in different locations the variation is so slight as to be negligible for the present purposes.

One object of the present invention is to provide a method of softening water in which sea water may be used as it comes from the ocean to recondition the water softening material.

A further object of the invention is to provide a suitable apparatus for carrying out such a method.

A further object of the invention is to provide automatically actuated means for controlling the operation of a softening apparatus.

Other objects of the invention will appear as the method and apparatus are described in detail.

In the accompanying drawings Fig. 1 is an elevation, partly in section, of a water softening appartus embodying my invention; Fig. 2 is an elevation partly broken away, of an automatically controlled water softening apparatus, with the means for supplying sea water to the receptacle omitted; Fig. 3 is a vertical sectional view of one of the controlling valves; Fig. 4 is a similar view of another controlling valve; Fig. 5 is a side elevation of one of the actuating cams and its connecting rod; Fig. 6 is a side elevation of the other cam with a connecting rod broken away; and Fig. 7 is a sectional detail view of one of the pilot valves.

In this drawing I have illustrated one form of apparatus for carrying out my method of softening water but it will be understood that this apparatus may take various forms without departing from the spirit of the invention.

As here shown, the water softening apparatus comprises a container 1 adapted to receive the water softening material and connected with this container, preferably near the bottom thereof is a supply pipe 2 for hard water which, if desired, may be provided with a controlling valve 3. A service pipe 4 leads from the container, preferably from the upper end thereof, and serves to deliver the softened water to the point or points of use. A drain pipe 5 also leads from the upper end of the container and, in the present instance, is connected therewith through the same outlet with which the service pipe 4 is connected. A valve 6 is interposed in the drain pipe 5 to control the flow of liquid therethrough and a check valve 7 is interposed in the service line and so arranged that when the drain valve 6 is open the back pressure in the service line will close the service line and thus prevent liquid from passing from the container to the service line.

As I have above explained ordinary sea water contains approximately the correct proportion of salt for reconditioning the water softening material and in carrying out my method of softening water I pass the hard water through the water softening material in the container 1 until the water softening material has taken up so much of the substances which harden the water that it no longer properly softens the water. I then introduce into the container 1 sea water which passes through the water softening material and restores to that material its normal base. When the reconditioning has been completed clear water from the supply pipe 2 is again passed through the softening material to wash out the salt and cleanse the container.

The sea water may be taken from the ocean and delivered to the container 1 in any suitable manner but, in the present instance, I have provided a receptacle 8 adapted to receive sea water and connected by a pipe 9 with the water supply pipe 2 so that the sea water may pass from the receptacle 8 to the container 1, through the softening material therein and out through the drain pipe. The pipe 9 is normally closed by a valve 10 which is opened when the reconditioning of the softening material is to be effected. Preferably the receptacle 8 is supported at such a height with relation to the container 1 that the sea water will flow by gravity from the receptacle through the softener but obviously if this arrangement is not practical or desirable other means may be provided for causing the sea water to pass through the container 1, such as a pump.

The water is preferably taken from the ocean by means of a pump 12 having an inlet 13 which may be led to any suitable source of supply for sea water. This pump is preferably operated by an electric motor 14 and is provided with a discharge pipe 15 which communicates with one end of a filter 16 which serves to remove from the sea water solid matter and impurities. The other end of the filter 16 is connected with a pipe 17 which discharges into the sea water receptacle 8.

Preferably means are provided for maintaining the level of the sea water in the receptacle 8 at a substantially uniform level. This may be accomplished either by controlling the operation of the motor or by interrupting the flow of water through the pipe 17. In the present instance, I employ both devices so that the sea water supply pipe 17 is closed when the motor is not in operation. To this end I have interposed a switch 18 in the circuit 19 for the motor 14 and have operatively connected the movable arm of this switch with a float 20 arranged within the sea water receptacle 8. This float is also operatively connected with a valve 21 which closes the discharge end of the sea water supply pipe 17. Consequently when the water in the receptacle 8 is at its normal level the float will open the switch 18 and close the valve 21.

The apparatus above described is manually controlled and each valve must be operated by hand at the proper time to effect the reconditioning of the softener. In Figs. 2 to 7 of the drawings I have illustrated another form of the apparatus in which the reconditioning of the softener is effected automatically. This apparatus is similar to that shown in the application for patent filed by me August 31, 1925, Serial No. 53,524, but has been rearranged and extended to provide for the automatic control of a hard water valve as well as the regenerating liquid valve and the drain valve. As here shown, the softener comprises a container 22, a supply pipe 23 communicating with the lower portion thereof, and an outlet pipe 24 leading from the upper end thereof and connected with a service pipe 25, controlled by a check valve 26 and also connected with a drain pipe 27, this much of the apparatus being substantially the same as that above described. The supply pipe 23 is connected with the source of supply for hard water and the flow of hard water through the supply pipe to the container is controlled by a valve 28 which is normally open. A regenerating liquid pipe 29 is connected with the supply pipe 23, between the valve 28 and the container, and is also connected with a sea water receptacle 30, this receptacle being preferably mounted in an elevated position so that the water will flow through the container by gravity. The sea water may be supplied to this receptacle 30 in the manner shown in Fig. 1 or in any other suitable manner. The flow of the regenerating liquid through the pipe 29 is controlled by a valve 31 which is normally closed. The drain pipe 27 is controlled by a valve 32 which is normally closed. When the valves 28, 31 and 32 are in their normal positions hard water will flow through the container to the service pipe, 25. These three valves are automatically controlled to cause the reconditioning of the softener at intervals determined by the quantity of liquid delivered thereto, the arrangement being such that when a predetermined quantity of hard water has been delivered to the softener the hard water valve 28 will be closed, the regenerating liquid valve 31 will be opened and the drain valve 32 will be opened, thus causing the regenerating solution to flow through the container and out through the drain pipe. After a predetermined quantity of regenerating liquid has passed through the container the valve 31 is closed and the hard water valve 28 opened and after a sufficient quantity of hard water has passed through the container to cleanse the same the drain valve 32 is closed, thus restoring the softening operation. The automatically controlled valves may take various forms and, as here shown, the hard water valve 28 comprises a valve member 33 carried by a stem 34, which is acted upon by a spring 35 to move the valve member 33 upwardly against its seat, and thus close the valve. The upper end of the stem 34 is provided with a plate 36 which bears against a diaphragm 37 forming the lower wall of a pressure chamber 38 which is connected by pipes 39 and 40 with a source of supply for water under pressure, preferably the main supply pipe for hard water, the pipe 40 having a restricted orifice 41 interposed between the same and the hard water pipe. The normal pressure of the water on the diaphragm 37 will overcome the pressure of the spring 35 and hold the valve member 33 in open position, thus maintaining the connection between a hard water supply and the container. In order that this pressure may be relieved and the valve member 33 may be moved to its closed position by the spring 35 the pressure chamber 38 is connected through the pipe 39 and a pipe 42 with a pilot valve 43, the opposite side of which is connected by pipes 44 and 45 with the drain pipe 27. The pilot valve is normally closed so that the diaphragm 37 will be subjected to the pressure of the water in the supply pipe but when the pilot valve is opened the pressure chamber is connected with the drain pipe and the pressure thus relieved, permitting the valve to close.

The regenerating liquid valve 31 is similar in character but the arrangement is such that the valve is held normally in its closed position. As here shown, a valve member 46 is acted upon by a spring 47 which tends to move the same to its open position. A stem 48 connected with the valve member has at its upper end a plate 49 contacting with the diaphragm 50 of a pressure chamber 51. This pressure chamber is connected by a pipe 52 with the pipes 40 and 42 so that when the pilot valve 43 is closed the diaphragm will be subjected to water pressure which will hold the valve member 46 on its seat but when the pilot valve is opened this pressure will be relieved and the spring 47 will move the valve member to its open position, thus establishing communication between the receptacle 30 and the container 22.

The drain valve 32 is of the same construction as the valve 31 and the pressure chamber 52 of the valve 32 is connected by a pipe 53 with the source of supply for water under pressure and the pipe 53 has a restricted orifice, as shown at 54. The pipe 53 is connected by a pipe 55 with one side of a second pilot valve 56, the other side of which is connected by a pipe 57 with the pipe 45 leading to the drain.

The pilot valves 43 and 56 may be of any suitable character and may be controlled in any suitable manner which will cause them to be operated at the desired intervals. In the present instance, the two pilot valves are identical in construction, the valve 43 being shown in Fig. 7. As there shown, the valve member 58 is carried by a stem 59 which moves the same upwardly against its seat to close the valve. The upper end of the stem 59 is connected with a lever 60 pivotally mounted on a link 61 carried by the valve casing and connected at its outer end with an actuating rod 62 which is acted upon by a cam 63 to open and close the valve 43. As shown in Figs. 2 and 5 the cam 63 consists of two plates mounted on a counter shaft 64 and adjustable with relation one to the other to provide the cam as a whole with a peripheral recess, as shown at 65, the relative adjustment of the two cam plates serving to vary the length of this recess. The lower end of the valve rod extends between the two parts of the cam and is provided at its lower edge with projections or rollers 66 which engage the edges of the respective parts of the cam. A spring 67 acts on the actuating rod to move the rod 62 upwardly and thus move the valve member 58 of the pilot valve downwardly to its open position. So long as the concentric portion of the cam is in contact with the projections 66 the valve will be held in its closed position but when the recess in the cam is brought into line with the projections the spring will move the valve to its open position and retain it open until the concentric portion of the cam again engages the projection. The operating mechanism of the pilot valve 56 is identical with that above described and the various parts thereof, as shown in Figs. 2 and 6, have been marked with the same reference numerals with the exception of the cam which is indicated at 68 and the two parts of which are so adjusted that the recess 69 is of a length materially greater than the length of the recess 65 of the cam 63.

The cams are slowly rotated as the liquid is delivered to the containers and to this end I have interposed in the supply pipe 23, between the regenerating liquid pipe 29 and the container 22, a fluid motor 70 which may be of any suitable character and inasmuch as the movement of the motor is in proportion to the amount of liquid passing through the same it also constitutes a meter. It is unnecessary to describe the internal construction of the motor but it is sufficient to note that it comprises a rotatable vertical shaft 71 having thereon a worm 72 which meshes with a worm wheel 73 on a countershaft 74 so that the countershaft and the cams carried thereby are rotated in accordance with the amount of the liquid delivered to the container 2. It will be apparent that when the several valves are in their normal positions the hard water will pass through the motor to the container and the motor will cause the cams to be slowly rotated and when a predetermined quantity of water has been delivered to the container the cams will actuate the pilot valves to reverse the positions of the valves 28, 31 and 32. Preferably the cams are so arranged that the reversal of the three major valves will take place practically simultaneously, thus cutting off the flow of hard water to the container and causing the regenerating solution or sea water to flow through the container and out through the drain pipe. The hard water valve 28 and the regenerating solution valve 31 are controlled by the same pilot valve but because of the reversed arrangement of the valve members the one valve will be opened when the other is closed. When a predetermined quantity of regenerating solution has been delivered to the softener the cam 63 will again close the pilot valve 43, thus causing the regenerating liquid valve 31 to be closed and the hard water valve 28 to be opened. The cam 68 having a longer recess will not close the pilot valve 56 until a quantity of hard water sufficient to wash out the regenerating solution has passed through the container but at the end of such an interval the pilot valve 56 will be closed, thus causing the drain valve 32 to be closed.

While I have shown and described one method and two apparatuses for carrying out my invention I wish it to be understood that I do not desire to be limited to the details thereof as various modifications may occur to a person skilled in the art.

Having now fully described my invention, what I claim as new and desire to secure by Letters Patent, is:

1. The method of softening hard water, consisting in passing the water which is to be softened through softening material having the property of taking up the substances which harden water and then restoring this softening material to its normal condition by subjecting the same to the action of sea water in substantially its natural state and then passing clear water through said material to cleanse the same.

2. The method of softening hard water consisting in passing the water which is to be softened through softening material having the property of taking up the substances which harden the water and then taking sea water direct from the ocean, filtering the same and then passing the filtered sea water through said water softening material to restore the same to its normal condition.

3. The method of softening hard water consisting in passing the water which is to be softened through softening material having the property of taking up the substances which harden the water and then taking sea water direct from the ocean, filtering the same, storing the filtered sea water in quantities ready for use and passing said sea water through the water softening material as needed.

4. In a water softening apparatus, a container for water softening material having means for connecting the same with a service pipe and a drain pipe, and a hard water supply pipe connected with said container, a pipe for reconditioning liquid connected with said container, and means taking water from the sea and for delivering said sea water to the last mentioned pipe.

5. In a water softening apparatus, a container for water softening material having means for connecting the same with a service pipe and a drain pipe, and a hard water supply pipe connected with said container, a storage receptacle, a pipe to connect said storage receptacle with said container, a valve interposed in the last mentioned pipe, a pump having an inlet pipe adapted to be immersed in sea water, and a discharge pipe leading from said pump to said storage receptacle.

6. In a water softening apparatus, a container for water softening material having means for connecting the same with a service pipe and a drain pipe, and a hard water supply pipe connected with said container, a storage receptacle, a pipe to connect said storage receptacle with said container, a valve interposed in the last mentioned pipe, a pump having an inlet pipe adapted to be immersed in sea water, a discharge pipe leading from said pump to said storage receptacle, and means controlled by the level of the sea water in said storage receptacle for controlling the operation of said pump.

7. In a water softening apparatus, a container for water softening material having means for connecting the same with a service pipe and a drain pipe, and a hard water supply pipe connected with said container, a storage receptacle, a pipe to connect said storage receptacle with said container, a valve interposed in the last mentioned pipe, a pump having an inlet pipe adapted to be immersed in sea water, a discharge pipe leading from said pump to said storage receptacle, and a filter interposed between said pump and said storage receptacle.

8. In a water softening apparatus, a container for water softening material, a supply pipe for hard water connected with said container, a normally open valve in said supply pipe to interrupt the delivery of hard water to said container, a regenerating liquid pipe leading to said container, a normally closed valve in said regenerating liquid pipe, a drain pipe connected with said container, a normally closed valve in said drain pipe, and means controlled by the liquid delivered to said container to cause said hard water valve to be closed and said drain valve and said regenerating liquid valve to be opened, to then cause said regenerating liquid valve to be closed and said hard water valve to be opened, and to then cause said drain valve to be closed.

9. In a water softening apparatus, a container for water softening material, a supply pipe for hard water connected with said container, a normally open valve in said supply pipe to interrupt the delivery of hard water to said container, a regenerating liquid pipe leading to said container, a normally closed valve in said regenerating liquid pipe, a drain pipe connected with said container, a normally closed valve in said drain pipe, means controlled by the hard water delivered to said container to cause said hard water valve to be closed and said drain valve and said regenerating liquid valve to be opened, and controlled by the regenerating liquid delivered to said container to cause the hard water valve to be opened and the regenerating liquid valve closed, and then again controlled by the hard water delivered to said container to cause the drain valve to be closed.

10. In a water softening apparatus, a container for water softening material, a supply pipe for hard water connected with said container, a normally open valve in said supply pipe, a regenerating liquid pipe connected with said supply pipe between said valve and said container, a normally closed valve in said regenerating liquid pipe, a drain pipe connected with said container, a normally closed valve in said drain pipe, a fluid motor interposed in said supply pipe between said regenerating liquid pipe and said container, and means controlled by said motor for first causing said hard water valve to be closed and said regenerating liquid valve and said drain valve to be opened, then causing said regenerating liquid valve to be closed and said hard water valve to be opened, and then causing said drain valve to be closed.

11. In a water softening apparatus, a container for water softening material, a hard water supply pipe connected with said container, a regenerating liquid pipe connected with said container, a drain pipe leading from said container, pressure operated valves to control the flow of liquid through the respective pipes, a pilot valve to control the hard water valve and the regenerating liquid valve, a second pilot valve to control the drain valve, and means controlled by the liquid delivered to said container for actuating said pilot valves.

12. In a water softening apparatus, a container for water softening material, a hard water supply pipe connected with said container, a valve in said pipe, pressure operated means for holding said valve normally in its open position, a regenerating liquid pipe connected with said container, a valve in said regenerating liquid valve, pressure controlled means for holding said valve normally in its closed position, a drain pipe leading from said container, a valve in said drain pipe, pressure controlled means for holding said valve normally in its closed position, a pilot valve connected with the pressure controlled devices for said hard water valve and said regenerating liquid valve, a second pilot valve connected with the pressure controlled device for said drain valve, and means controlled by the liquid delivered to said container for actuating said pilot valves to control the pressure in the several pressure controlled devices.

13. In a water softening apparatus, a container for water softening material, a hard water supply pipe connected with said container, a valve in said pipe, pressure operated means for holding said valve normally in its open position, a regenerating liquid pipe connected with said container, a valve in said regenerating liquid pipe, pressure controlled means for holding said valve normally in its closed position, a drain pipe leading from said container, a valve in said drain pipe, pressure controlled means for holding said valve normally in its closed position, a pilot valve connected with the pressure controlled devices for said hard water valve and said regenerating liquid valve, a second pilot valve connected with the pressure controlled device for said drain valve, means controlled by the liquid delivered to said container to first actuate both pilot valves to relieve the pressure in the three pressure controlled devices, to then operate the first mentioned pilot valve to restore the pressure on the pressure controlled devices for said hard water valve and said regenerating liquid valve, and to subsequently operate the last mentioned pilot valve to restore the pressure on the pressure controlled device for said drain valve.

In testimony whereof, I affix my signature hereto.

EDWARD T. TURNER.